Oct. 22, 1940.                J. L. HATHAWAY                    2,218,642
                              FREQUENCY METER
                           Filed March 17, 1938

INVENTOR.
JARRETT L. HATHAWAY
BY
ATTORNEY.

Patented Oct. 22, 1940

2,218,642

UNITED STATES PATENT OFFICE 2,218,642

FREQUENCY METER

Jarrett L. Hathaway, Manhasset, N. Y., assignor to Radio Corporation of America, a corporation of Delaware Application March 17, 1938, Serial No. 196,393

14 Claims. (Cl. 172—245)

This invention relates to direct reading electronic frequency meters and has for a primary object the measurement of frequencies from zero to several megacycles by electronic means.

Another object is to provide a simplified frequency meter which will have an accuracy comparable to other direct reading frequency meters.

As far as I am aware, direct reading electronic frequency meters heretofore known and used have been inherently far more cumbersome than my improved device. Furthermore, they ordinarily have a restricted frequency range, the usual maximum frequency measurable being in the neighborhood of 5,000 cycles per second. Due to limitations imposed by the elements used in previously known meters or counters, it appears improbable that such circuits can be made to function satisfactorily much above 12,000 cycles per second.

Briefly, my invention involves the application of the wave of unknown frequency to the grid circuit of a high gain thermionic discharge amplifier tube at sufficient amplitude to drive the grid of the tube far past cut-off on the negative grid swing. The output from this tube has a flat topped wave form with a wave front substantially independent of the shape of the input wave. Pulses derived from the output circuit are rectified and the resultant average direct current which varies in accordance with the input frequency is applied to a suitably calibrated meter.

Figure 1:
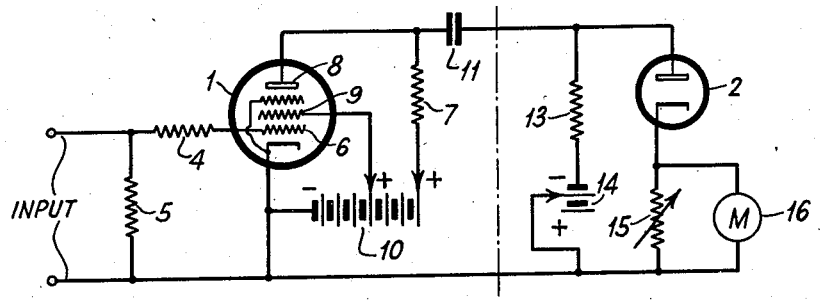
Figure 1A:
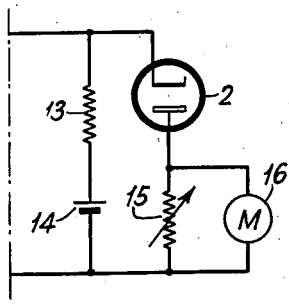
Figure 1B:
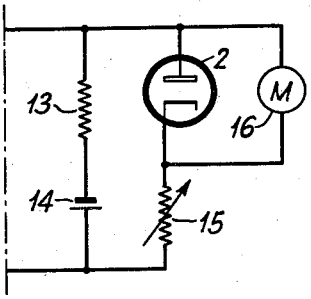
Figure 1C:
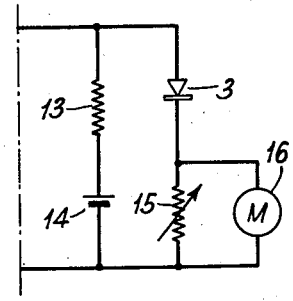

A better understanding of the invention will be had by referring to the following detailed description which is accompanied by the drawing wherein Figure 1 illustrates an embodiment of my invention; Figures 1A, 1B and 1C illustrate modifications of the portion of Figure 1 to the right of the dotted line and Figure 2 shows another embodiment of my invention.

Referring, now, to Figure 1, reference numeral 1 denotes a high amplification thermionic discharge tube having an input circuit 4, 5 connected to the grid 6. The output circuit 7 of this tube is connected to plate 8 and includes a battery 10. Screen grid 9 is also energized from the battery 10. The wave of unknown frequency which it is desired to measure is applied across resistor 5. Resistor 4 is included in the grid circuit in order to prevent grid 6 from being driven appreciably positive. The input voltage must be sufficient to drive tube 1 so far past cut-off that the slope of the wave from zero to negative cut-off voltage is independent of the level in order to assure that the reading obtained is independent of the input amplitude. In order to prevent excessive input voltage requirements, a high amplification tube is used with potentials on the elements adjusted so that grid cut-off voltage is low. The flat topped voltage pulses developed across resistor 7 are applied to load resistor 13 through condenser 11. These pulses are rectified by rectifier tube 2 and the resultant rectified current pulses actuate meter 16. With a fixed value of condenser 11 and of resistors 13 and 15 these pulses are of predetermined amplitude and wave shape, provided a sufficient, or more than sufficient, input level is used. The number of these pulses per second increases with the input frequency thus creating a greater rectified average current through meter 16. If condenser 11 or resistor 13 are decreased in value the width of the rectified current pulses decreases, likewise decreasing the average current. Thus, for a lowered value of condenser 11 a higher frequency is required to create a given direct current through meter 16. In this way different ranges of operation are available by the variation of condenser 11. Resistance 15 shunting the meter 16 will also serve to change the frequency range. A bias battery 14 is provided in series with resistor 13 to prevent meter 16 from reading up scale when no signal is applied to the input. The voltage of this battery should be about 1½ volts. This may be variable, if desired, in order to change the frequency range.

Figures 1A, 1B and 1C, which illustrate modifications of the circuit of Figure 1 to the right of the dotted line, show different means of connecting the rectifier 2 and meter 16. These changes may be desirable under certain circumstances. In Figure 1C a contact type rectifier 3 has been substituted for the thermionic rectifier shown in the preceding figures. With this type of rectifier it may be desirable to apply, by means of battery 14, a bias voltage of proper polarity and amplitude, to overcome the threshold resistance of the contact rectifier.

Figure 2:
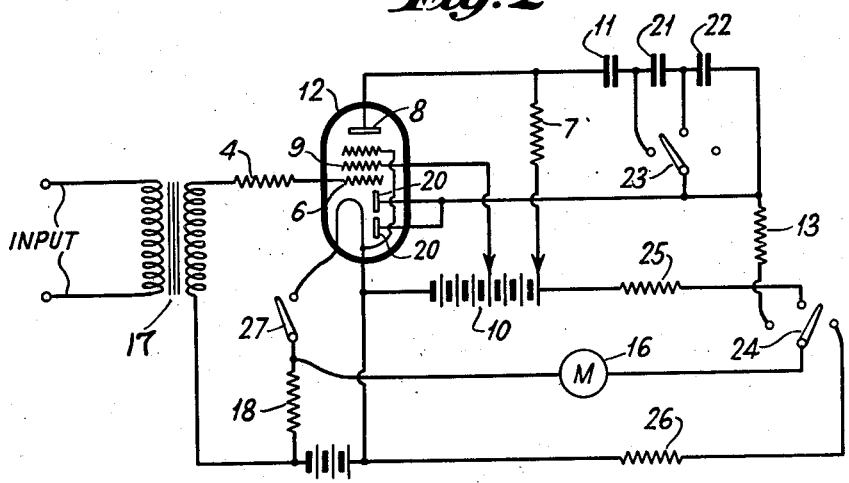

The embodiment of my device shown in Figure 2 is quite similar to that shown in Figure 1. In order to make the device more compact tubes 1 and 2 have been combined in a single tube 12 which contains a pentode amplifier and a diode rectifier. Transformer 17 is used to isolate the grid from any direct current component in the unknown frequency, as well as step up the input voltage. The operation of this circuit is the same as that of Figure 1. As shown in this figure no bias battery is required for the rectifier due to the diode elements of the tube 12 being at the plus end of the filament and the return of the meter circuit being connected to a more negative point in the circuit, that is, the minus end of the filament. As shown in this figure a plurality of frequency ranges may be selected by selectively connecting into the circuit condensers 11, 21 and 22 by means of switch 23. Meter 16 may be used to check filament or plate supply of voltages by means of switch 24, as well as to indicate the frequency. Multiplying resistances 25 and 26 are provided in the voltage checking circuits to convert the meter into a voltmeter of the proper range. Switch 27 is an off-on switch. Obviously, Figure 2 may be modified in the same way as indicated for Figure 1 and Figures 1A, 1B and 1C.

While I have illustrated and described my particular arrangements for carrying the invention into effect my invention is by no means limited to the particular arrangements shown and described and modifications may be made without departing from the scope and spirit of the invention.

I claim:

1. In combination a thermionic discharge tube having a cathode, a grid and a plate, a pair of resistances connected in series between said grid and said cathode, an input circuit connected to said cathode and the junction between said pair of resistances, an output circuit for said tube including a resistance and a source of potential connected between said plate and said cathode, a condenser having one terminal connected to said plate, a fourth resistance connected between the other terminal of said condenser and said cathode, and a rectifier and a meter connected across said fourth resistance.

2. In combination a thermionic discharge tube having a cathode, a grid and a plate, a pair of resistances connected in series between said grid and said cathode, an input circuit connected to said cathode and the junction between said pair of resistances, an output circuit for said tube including a resistance and a source of potential connected between said plate and said cathode, a condenser having one terminal connected to said plate, a fourth resistance and a second source of potential connected between the other terminal of said condenser and said cathode and a rectifier and a meter connected across said fourth resistance and said second source of potential.

3. In combination a thermionic discharge tube having a cathode, a grid and a plate, an input circuit connected between said grid and cathode, an output circuit for said tube including a resistance and a source of potential connected between said plate and said cathode, a condenser also connected to said plate, a second resistance connected from said condenser to said cathode and a rectifier and a meter connected in series across the second resistance.

4. In combination a thermionic discharge tube having a cathode, a grid and a plate, a resistance connected between said grid and cathode, means for applying an electric wave across said resistance, an output circuit for said tube including a resistance and a source of potential connected between said plate and said cathode, a condenser also connected to said plate, a third resistance connected from said condenser to said cathode and a rectifier and a meter connected in series across the third resistance.

5. In combination a thermionic discharge tube having a cathode, a grid and a plate, an input circuit including a resistance connected between said grid and cathode, an output circuit for said tube including a resistance and a source of potential connected between said plate and said cathode, a condenser also connected to said plate, a third resistance connected from said condenser to said cathode, a rectifier and a meter connected in series across said third resistance and a second source of potential connected in series with said third resistance.

6. In combination a thermionic discharge tube having a cathode, a control grid, a screen grid and a plate, an input circuit including a resistance connected between said control grid and cathode, an output circuit for said tube including a resistance and a source of potential connected between said plate and said cathode, means connecting said screen grid to said source of potential, a condenser also connected to said plate, a third resistance connected from said condenser to said cathode, a rectifier and a meter connected in series across said third resistance and a second source of potential connected in series with said third resistance.

7. In combination a thermionic discharge tube having a cathode, a grid and a plate, an input circuit including a resistance connected between said grid and cathode, an output circuit for said tube including a resistance and a source of potential connected between said plate and said cathode, a condenser also connected to said plate, a third resistance connected from said condenser to said cathode, a rectifier and a meter connected in series across said third resistor, a variable resistance in parallel with said meter and a second source of potential connected in series with said third resistance.

8. In combination a thermionic discharge tube having a cathode, a control grid, a screen grid and a plate, an input circuit including a resistance connected between said control grid and cathode, an output circuit for said tube including a resistance and a source of potential connected between said plate and said cathode, means connecting said screen grid to said source of potential, a condenser also connected to said plate, a third resistance connected from said condenser to said cathode, a rectifier and a meter connected in series across said third resistor, a variable resistance in parallel with said meter and a second source of potential connected in series with said third resistance.

9. In combination a thermionic discharge tube having a cathode, a grid and a plate, an input circuit including a resistance connected between said grid and cathode, an output circuit for said tube including a resistance and a source of potential connected between said plate and said cathode, a condenser also connected to said plate, a third resistance connected from said condenser to said cathode, a rectifier and a variable resistance connected in series across said third resistance and a meter shunting said rectifier.

10. In combination a thermionic discharge tube having a cathode, a grid and a plate, an input circuit including a resistance connected between said grid and cathode, an output circuit for said tube including a resistance and a source of potential connected between said plate and said cathode, a condenser also connected to said plate, a third resistance connected from said condenser to said cathode, a rectifier and a variable resistance connected in series across said third resistance and a meter shunting said variable resistor.

11. In combination a thermionic discharge tube having a filament, a plate and control grid adapted to influence the electron flow betweeen said filament and said plate, a second plate at one end of said filament, a source of filament heating current having its positive pole connected to said end, an input circuit connected between said control grid and one end of said filament, a plate circuit connected between said first mentioned plate and the positive end of said filament and including a source of potential, a plurality of condensers connected to said plate, means for selectively connecting said condensers to said second plate and a resistance and a meter connected in series between said second plate and the end of said filament remote from said second plate.

12. In combination a thermionic discharge tube having a filament, a plate and control grid adapted to influence the electron flow between said filament and said plate, a second plate at one end of said filament, means for energizing said filament having its positive pole connected to said end, an input circuit connected between said control grid and the other end of said filament, a plate circuit connected between said first mentioned plate and the positive end of said filament and including a source of potential, a plurality of condensers connected to said plate, means for selectively connecting said condensers to said second plate and a resistance and a meter connected in series between said second plate and the end of said filament remote from said second plate.

13. In combination a thermionic discharge tube having a filament, a plate, a control grid adapted to influence the electron flow between said filament and plate and a screen grid, a second plate at one end of said filament, a source of filament heating current having its positive pole connected to said end, an input circuit connected between said control grid and one end of said filament, a plate circuit connected between said first mentioned plate and the positive end of said filament and including a source of potential, means for connecting said screen grid to said source of potential, a plurality of condensers connected to said plate, means for selectively connecting said condensers to said second plate, a resistance and a meter connected in series between said second plate and the end of said filament remote from said second plate.

14. In combination a thermionic discharge tube having a filament, a plate, a control grid adapted to influence the electron flow between said filament and plate and a screen grid, a second plate at one end of said filament, a source of filament heating current having its positive pole connected to said end, an input circuit connected between said control grid and one end of said filament, a plate circuit connected between said first mentioned plate and the positive end of said filament and including a source of potential, means for connecting said screen grid to said source of potential, a plurality of condensers connected to said plate, means for selectively connecting said condensers to said second plate, a resistance and a meter connected in series between said second plate and the end of said filament remote from said second plate, auxiliary resistances each having one end connected to the positive end of said source of filament heating current and said source of potential respectively, and means for selectively connecting said meter between the other end of said auxiliary resistances and the negative end of said sources.

JARRETT L. HATHAWAY.